3,188,329
DIURETIC ANILS
Jerry E. Robertson, Milwaukee, Wis., assignor to Colgate-Palmolive Company, a corporation of Delaware
No Drawing. Filed Apr. 10, 1962, Ser. No. 186,355
12 Claims. (Cl. 260—397.7)

This invention relates to aniline derivatives. More particularly, this invention is concerned with novel anils, processes of preparing the same and uses for such compounds.

According to the present invention there are provided novel 2-substituted sulfamyl-4-sulfamyl-N-(3-hydroxy-2-propenylidene)-anilines of the formula

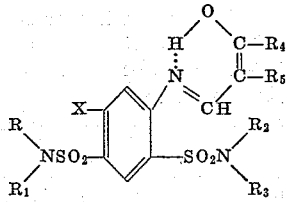

in which X is a halogen such as chlorine and bromine, nitro or a halo-lower alkyl group such as chloromethyl and trifluoromethyl, R, $R_1$ and $R_2$ are the same or different groups such as hydrogen, lower alkyls such as methyl, ethyl, propyl and isopropyl, lower alkenyls such as allyl, lower alkynyl such as propargyl, aralkyl groups and particularly phenyl-lower alkyl groups such as benzyl, phenethyl and phenylisopropyl, and halo-lower alkyl groups such as $\beta,\beta,\beta$-trifluoroethyl, $R_3$ is a group such as represented by R but is not hydrogen, $R_4$ and $R_5$ represent groups such as hydrogen, lower alkyls such as methyl, ethyl and propyl, aryl groups and particularly phenyl, aralkyl groups such as phenyl-lower alkyl groups including benzyl and phenethyl, and groups in which $R_4$ and $R_5$ are joined to each other and constitute an alkylene having 3 to 5 carbons thereby forming cyclopentenyl, cyclohexenyl and cycloheptenyl rings.

The novel 2-$R_3$ sulfamyl-4-sulfamyl-5-X-N-(3-hydroxy-2-propenylidene)-anilines of this invention are produced by reacting malonaldehyde or a beta-keto aldehyde, or acetals of such compounds formed from lower alcohols, with a 2-$R_3$ sulfamyl-4-sulfamyl-5-X-aniline. This process using the dialdehyde, or acetal thereof, can be represented as follows:

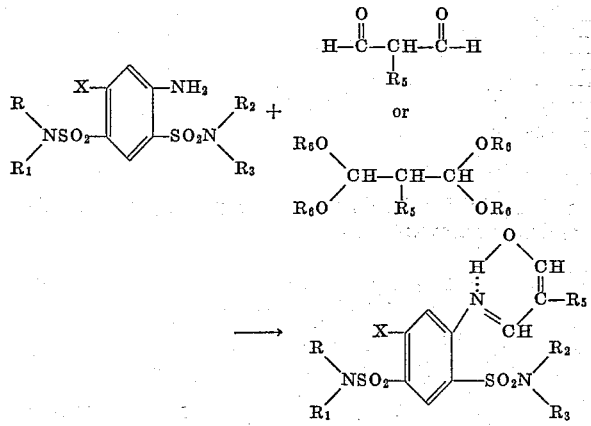

wherein R, $R_1$, $R_2$, $R_3$, $R_5$ and X have the assigned significance and $R_6$ is a lower alkyl such as methyl and ethyl.

The process using a beta-keto-aldehyde, or acetal thereof, can be represented as follows:

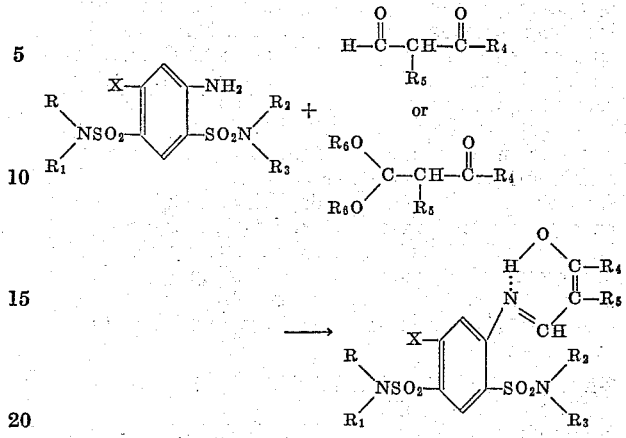

wherein R, $R_1$, $R_2$, $R_3$, $R_4$, $R_5$, $R_6$ and X have the assigned significance.

Representative of the aldehyde reactants that can be used in the process are malonaldehyde, malonaldehyde tetraethylacetal, acetylacetaldehyde, acetylacetaldehyde dimethylacetal, 3-phenyl-3-oxopropanal, 3-benzyl-3-oxopropanal, 3-phenethyl-3-oxopropanal, propionylacetaldehyde, 2-methyl-3-phenyl-3-oxopropanal, 2-phenyl malonaldehyde, 2-formylcyclohexanone, 2-formylcyclopentanone, 2-formylcycloheptanone, acetals thereof with lower alcohols such as methanol and ethanol, and alkali metal salts thereof such as the sodium and potassium salts which are converted in situ to the free aldehydes. Many of these reactants, as well as many others that can be used are disclosed in Organic Reactions, John Wiley & Sons, Inc., London, vol. VIII, 1954, pages 164–166. These reactants can also be used as alkali metal salts.

Some of the 2-$R_3$ sulfamyl-4-sulfamyl-5-X-anilines which can be used in the process are:

2-methylsulfamyl-4-sulfamyl-5-chloro-aniline,
2-dimethylsulfamyl-4-dimethylsulfamyl-5-trifluoromethyl-aniline,
2-ethylsulfamyl-4-ethylsulfamyl-5-bromo-aniline,
2-benzylsulfamyl-4-benzylsulfamyl-5-nitro-aniline,
2-allylsulfamyl-4-allysulfamyl-5-trifluoromethyl-aniline,
2-dibenzylsulfamyl-4-dibenzylsulfamyl-5-nitro-aniline,
2-allylsulfamyl-4-sulfamyl-5-chloro-aniline,
2-allysulfamyl-4-sulfamyl-5-trifluoromethyl-aniline,
2-allylsulfamyl-4-sulfamyl-5-bromo-aniline,
2-propargylsulfamyl-4-sulfamyl-5-chloro-aniline,
2-benzylsulfamyl-4-sulfamyl-5-trifluoroacetylamino-aniline,
2-benzylsulfamyl-4-sulfamyl-5-chloro-aniline,
2-(beta-phenethyl)-sulfamyl-4-sulfamyl-5-trifluoromethyl-aniline,
2-phenylisopropylsulfamyl-4-sulfamyl-5-chloro-aniline,
2-propargylsulfamyl-4-sulfamyl-5-trifluoromethyl-aniline,
2-(para-methoxybenzyl)sulfamyl-4-sulfamyl-5-trifluoromethyl-aniline,
2-benzylsulfamyl-4-sulfamyl-5-trifluoromethyl-aniline,
2-(beta-phenethyl)-sulfamyl-4-sulfamyl-5-chloro-aniline,
2-butenylsulfamyl-4-sulfamyl-5-bromo-aniline,
2-pentenylsulfamyl-4-sulfamyl-5-chloro-aniline,
2-methylsulfamyl-5-nitro-4-sulfamylaniline,
2-ethylsulfamyl-5-nitro-4-sulfamylaniline, 2-propylsulfamyl-5-nitro-4-sulfamylaniline,
2-allylsulfamyl-5-nitro-4-sulfamylaniline,
2-($\beta,\beta,\beta$-trifluoroethylsulfamyl)-5-nitro-4-sulfamyl-
    aniline,
2-phenylsulfamyl-5-nitro-4-sulfamylaniline,
2-benzylsulfamyl-5-nitro-4-sulfamylaniline, and
2-(beta-phenethyl)-sulfamyl-5-nitro-4-sulfamylaniline.

Reaction between the aldehyde and the 2-$R_3$ sulfamyl-4-sulfamyl-5-X-anilines is effected by bringing the reactants together in a suitable solvent such as an alcohol including methanol and ethanol, dimethylformamide or an excess of the reacting aldehyde or acetal thereof. Water can be present in the reaction mixture. An acid catalyst such as aqueous hydrochloric acid is included in the mixture to promote the reaction. Temperatures from about room temperature to about 100° C. can be used satisfactorily. The reaction is generally completed in from about one hour to one day with a few hours being an approximate average reaction time. After the reaction is terminated, the solvent is removed as by evaporation under reduced pressure, the residue taken up in alcohol and crystallized from aqueous alcohol.

Among the products which are produced as described are:

2-methylsulfamyl-4-sulfamyl-5-chloro-N-(3-hydroxy-
    2-butenylidene)-aniline,
2-allylsulfamyl-4-sulfamyl-5-chloro-N-(3-hydroxy-
    2-butenylidene)-aniline,
2,4-bis-(dimethylsulfamyl)-5-chloro-N-(3-hydroxy-
    2-butenylidene)-aniline,
2-methylsulfamyl-4-sulfamyl-5-trifluoromethyl-N-(3-
    hydroxy-2-butenylidene)-aniline,
2-allylsulfamyl-4-sulfamyl-5-chloro-N-(3-hydroxy-
    3-phenyl-2-propenylidene)-aniline,
2,4-bis(methylsulfamyl)-5-chloro-N-(3-hydroxy-2-
    butenylidene)-aniline,
2-methylsulfamyl-4-sulfamyl-5-trifluoromethyl-N-(2-
    hydroxy-cyclohexen-1-ylmethylidene)-aniline and
2-ethylsulfamyl-4-sulfamyl-5-chloro-N-(3-hydroxy-
    2-butenylidene)-aniline as well as compounds of Table
    1 following.

TABLE 1

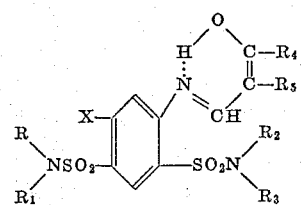

| X | R | $R_1$ | $R_2$ | $R_3$ | $R_4$ | $R_5$ |
|---|---|---|---|---|---|---|
| $CF_3$ | Ethyl | H | Ethyl | H | H | H. |
| $CF_3$ | Benzyl | H | Benzyl | H | Methyl | H. |
| Cl | Methyl | Methyl | Methyl | Methyl | Ethyl | H. |
| Cl | Phenyl | H | Phenyl | H | Methyl | H. |
| Nitro | H | H | Ethyl | H | Methyl | H. |
| Nitro | H | H | Allyl | H | Phenyl | Methyl. |
| Br | H | H | Propargyl | H | Benzyl | H. |
| $CF_3$ | H | H | Benzyl | H | $R_4+R_5$=propylene. | |
| $CF_3$ | Allyl | H | Allyl | H | $R_4+R_5$=butylene. | |

These novel anils are potent diuretic, natriuretic and antihypertensive agents in animals, including humans. Hence, they are useful in the treatment of congestive heart failure, in the relief of edema and ascites as well as in the treatment of high blood pressure. One of the compounds, 2-allyl-sulfamyl-5-chloro-4-sulfamyl-N-(3-hydroxy-2-butenylidene)-aniline (EX–4810), is considerably more potent than hydrochlorothiazide with respect to urinary and sodium output without a comparable increase in potassium excretion. The lack of concomitant increase in potassium excretion with increased diuretic potency would confer optimum therapeutic activity and a minimum of side effects due to potassium spillage.

Compound EX–4810 is a particularly potent diuretic as shown by the test results in Table 2 following:

TABLE 2.—COMPARISON OF DIURETIC EFFECT AFTER ORAL ADMINISTRATION OF EX–4810 AND HYDROCHLOROTHIAZIDE TO THE SAME GROUP OF DOGS

| | Dose, mg./kg. | Urinary Volume [1] | Total m. eq. for Six Hours ±S.E. | | |
|---|---|---|---|---|---|
| | | | Na | Cl | K |
| EX–4810 | 0.1 | 141 | 33.79±4.52 | 39.77±6.01 | 8.21±1.53 |
| Hydrochlorothiazide | 0.1 | 104 | 16.88±2.24 | 17.36±1.78 | 6.45±1.61 |

[1] Average 0.5 hour percent increase for 6 hours.

The anil compounds of this invention can be administered in pharmaceutical unit-dosage forms formed by combining one or more of the active compounds with a pharmaceutical carrier such as talc or sucrose and then manufacturing capsules, tablets and powders therefrom using other additives as warranted. Such unit-dosage forms can contain about 5 to 500 mg., and advisably 5 to 100 mg., of one or more of the active compounds of this invention.

The compounds containing fully substituted sulfamyl groups are neutral and the compounds having partially substituted sulfamyl groups are weakly acidic.

The 2-substituted-4-sulfamyl-5-X-anilines, where X has the assigned meaning, used as starting materials are either disclosed in the art, or are producible by methods already published, or can be produced as hereinafter described. Some of the publications which disclose various starting materials are J. Am. Chem. 82, 1132—1135 and 1161–1166 (1960); J. Org. Chem. 25, 970/981 (1960); J. Org. Chem. 26, 3423–3433 and 4315–4325 (1961).

The 2,4-bis(substituted sulfamyl)-5-X-anilines can be readily produced by known methods by reacting a 5-X-aniline disulfonyl chloride with a primary or secondary amine as follows:

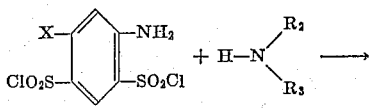

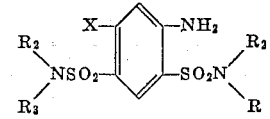

in which X, $R_2$ and $R_3$ have the assigned meanings.

The reactants of the formula

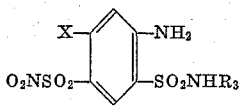

in which X and $R_3$ have the assigned meaning, except that X is not nitro, can be produced by reacting a 3-keto-7-sulfamyl - 2H-1,2,4-benzothiadiazine-1,1-dioxide with an alkylating, alkenylating, alkynylating or aralkylating agent to produce a 2-substituted-3-keto-7-sulfamyl-1,2,4-benzothiadiazine-1,1-dioxide and treating said compound with a base to open the ring and form a 2-substituted-sulfamyl-4-sulfamyl-aniline. This process can be represented as follows:

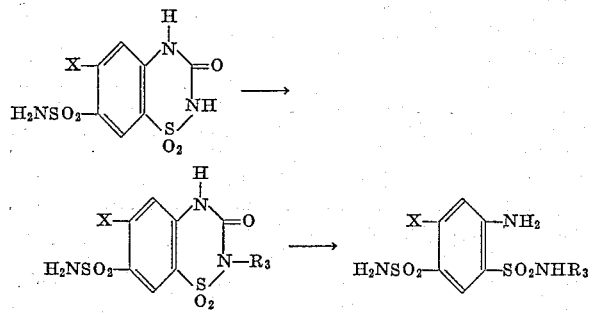

wherein X and $R_3$ have the assigned meanings except that X is not nitro here.

The 3-keto-7-sulfamyl-2H-1,2,4-benzothiadiazine-1,1-dioxides used in this process can be produced as in J. Am. Chem. Soc. 82, 2042 (1960), and J. Am. Chem. Soc. 82, 1132 (1960).

The described process can be effected by procedures in the literature as in J. Am. Chem. Soc. 82, 1132 (1960). Some of the compounds that can be produced in the first step of this process are 2-allyl-3-keto-6-trifluoromethyl-7-sulfamyl-1,2,4-benzothiadiazine-1,1-dioxide,
2-benzyl-3-keto-6-trifluoromethyl-7-sulfamyl-1,2,4-benzothiadiazine-1,1-dioxide,
2-phenethyl-3-keto-6-chloro-7-sulfamyl-1,2,4-benzothiadiazine-1,1-dioxide,
2-propargyl-3-keto-6-chloro-7-sulfamyl-1,2,4-benzothiadiazine-1,1-dioxide,
2-cinnamyl-3-keto-6-trifluoromethyl-7-sulfamyl-1,2,4-benzothiadiazine-1,1-dioxide,
2-benzyl-3-keto-6-chloro-7-sulfamyl-1,2,4-benzothiadiazine-1,1-dioxide,
2-(beta-phenethyl)-3-keto-6-bromo-7-sulfamyl-1,2,4-benzothiadiazine and
2-allyl-3-keto-6-chloro-7-sulfamyl-1,2,4-benzothiadiazine.

Opening of the ring can be achieved in an aqueous inorganic basic medium at a moderately elevated temperature employing conventional techniques. Some of the compounds produced in this way are:

2-allylsulfamyl-4-sulfamyl-5-trifluoromethylaniline,
2-ethylsulfamyl-4-sulfamyl-5-chloroaniline,
2-propargylsulfamyl-4-sulfamyl-5-chloroaniline,
2-allylsulfamyl-4-sulfamyl-5-chloroaniline,
2-benzylsulfamyl-4-sulfamyl-5-trifluoromethylaniline,
2-(beta-phenethyl)-4-sulfamyl-5-chloroaniline and
2-(beta-phenethyl)-4-sulfamyl-5-trifluoromethylaniline.

The compounds of the formula

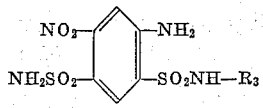

where $R_3$ has the assigned meaning, can be prepared by reacting 5-nitroaniline-2,4-disulfonylchloride first with ammonia and then with a monosubstituted amine. This process can be represented as follows:

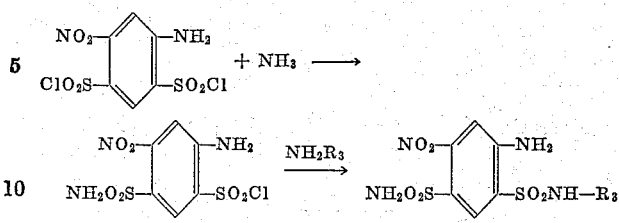

wherein $R_3$ has the assigned meaning.

The first step of the process is readily effected by bringing 5-nitroaniline-2,4-disulfonylchloride into contact with ammonia, advisably in a suitable solvent and particularly ethanol. The ammonia can be suitably employed dissolved in the ethanol. The reaction proceeds readily at room temperature and can be considered complete in 0.5 to 1 hour. The monosubstituted amine can then be added as in ethanol solution, to the reaction mixture. This reaction also proceeds at room temperature but slightly elevated temperatures serve to promote the reaction. The desired product can be recovered by diluting the reaction mixture with water and partially evaporating the solution to precipitate out the product.

Some of the monosubstituted amines which can be used in the process are methylamine, ethylamine, propylamine, isopropylamine, allylamine, benzylamine, phenethylamine, aniline, $\beta,\beta,\beta$-trifluoroethylamine, propargylamine, dimethylaminoethylamine and cinnamylamine.

Some of the products obtained as described have been named previously.

The following examples are presented to illustrate the invention.

EXAMPLE 1

*2-allylsulfamyl-5-chloro-4-sulfamylaniline*

6-chloro-3,4-dihydro-3-keto-7-sulfamyl - 1,2,4 - benzothiadiazine-1,1-dioxide (14.8 g., 0.0475 mole) was dissolved in 50 ml. of dimethylformamide and 2.1 g. of 56.3% NaH in oil (0.0475 mole) was added with stirring at room temperature. After 0.5 hour of additional stirring, 6.05 g. (0.0475 mole) of allyl bromide was added and the mixture held at 60–70° C. for 3 hours. After cooling, the reaction mixture was poured into 1.5 liters of water. Cooling overnight gave a solid which was collected, washed with water, dissolved in dilute NaOH and reprecipitated with dilute acetic acid. The resultant solid was collected, washed with water and dried to afford 13.4 g. (81%) of 2-allyl-6-chloro-3,4-dihydro-3-keto-7-sulfamyl-1,2,4-benzothiadiazine-1,1-dioxide, M.P. 285–289° C.

*Analysis.*—Calcd. for $C_{10}H_{10}ClN_3O_5S_2$: S, 18.21; Cl, 10.07. Found: S, 17.97; Cl, 10.25.

2-allyl-6-chloro-3,4-dihydro-3-keto-7-sulfamyl - 1,2,4-benzothiadiazine-1,1-dioxide (26.0 g., 0.075 mole) dissolved in 300 ml. of 15% NaOH was held at 90–100° C. for 7 hours. Cooling and addition of excess hydrochloric acid gave a solid which was collected, washed with water and recrystallized from dilute ethanol to afford 11.1 g. (45%) of the product as a monohydrate, M.P. 76–78° C.

*Analysis.*—Calcd. for $C_9H_{14}ClN_3O_5S_2$: S, 18.70. Found: S, 18.71.

Extended drying at 100° C. gave the product as an amorphous solid.

*Analysis.*—Calcd. for $C_9H_{12}ClNO_3O_4S_2$: S. 19.72; Cl, 10.89. Found: S. 19.48; Cl, 10.98.

EXAMPLE 2

*2-allylsulfamyl-4-sulfamyl-5-chloro-N-(3-hydroxy-2-butenylidene)-aniline*

2-allylsulfamyl-5-chloro-4-sulfamylaniline monohydrate (6.9 g., 0.020 mole) was dissolved in 14 ml. acetylacetaldehyde dimethylacetal at room temperature and the viscous solution was filtered. Addition of 6 drops of 10:1 H₂O/concentrated HCl, and stirring for 20 hours gave a heavy suspension. Dilution with 150 ml. of ethanol, collection of the solid, washing twice with 40 ml. portions of ethanol, and drying gave 6.2 g. (78%) of product, M.P. 204–206° C.

*Analysis.*—Calcd. for $C_{13}H_{16}ClN_3O_5S_2$: Cl, 9.00; N, 10.67; S, 16.27. Found: Cl, 9.05; N, 10.79; S, 16.32. λmax. 343mμ (ε32,900).

EXAMPLE 3

*2-methylsulfamyl-4-sulfamyl-5-trifluoromethylaniline*

3 - keto-6-trifluoromethyl-7-sulfamyl-2H-1,2,4-benzothiadiazine-1,1-dioxide (52.8 g., 0.152 mole) was dissolved in 125 ml. of dimethyl formamide. Sodium hydride (3.7 g., 0.152 mole) was added in portions with stirring and the resultant solution was warmed to 70° C. After 15 minutes at this temperature, 21.7 g. (0.153 mole) of methyl iodide was added dropwise and the mixture held at about 70° C. for another hour. The reaction solution was cooled and poured into 3.8 liters of cold water. After standing and cooling overnight, the solids which separated were collected, washed with water and dried. This crude product was recrystallized from acetonitrile (Darco) to afford 42.5 g. (77.1%) of pure 2-methyl-3-keto-6-trifluoromethyl - 7-sulfamyl-1,2,4-benzothiadiazine-1,1-dioxide, M.P. 291–293° C. (dec.).

*Analysis.*—Calcd. for $C_9H_8N_3O_5S_2F_3$: N, 11.70; S, 17.85. Found: N, 11.70; S, 17.71.

2-methyl-3-keto-6-trifluoromethyl - 7 - sulfamyl - 1,2,4-benzothiadiazine-1,1-dioxide (31.4 g., 0.087 mole) and 400 ml. of 10% sodium hydroxide solution were heated and stirred for 3 hours at 40°–43° C., overnight at 50–53° C., and 6 hours at 128–130° C. Acidification with excess hydrochloric acid and cooling gave a solid which was collected, washed with water and dried. Purification was affected by dissolution in 250 ml. boiling ethanol, treatment with charcoal, filtration and dilution to 700 ml. with water. Cooling gave the purified product which was collected, washed with water and dried. The solid was ground under benzene, collected and redried to afford 19.7 g. (67.7%) of product, M.P. 177–180° C.

*Analysis.*—Calcd. for $C_8H_{10}N_3O_4S_2F_3$: N, 12.61; S, 19.24. Found: N, 12.74; S, 19.50.

EXAMPLE 4

*2-propylsulfamyl-5-nitro-4-sulfamylaniline*

To a stirred suspension of 8.5 g. (0.025 mole) of 5-nitroaniline-2,4-disulfonyl chloride in 50 ml. of ethanol at 20° C. was added 10 ml. of cold 5.07 N ethanolic ammonia (0.050 mole) over about one hour. After stirring at about 20° C. for an additional hour, 5.9 g. (0.10 mole) of n-propylamine was added in one portion. The resultant exothermic reaction was controlled with an ice water bath. After one hour of standing at room temperature, the reaction mixture was reduced in vacuo in about one-half of the original volume and then poured into 300 ml. of water. After standing at room temperature for two days, the solid which separated was collected by filtration, washed with water, dried and pulverized to afford 6.0 g. (71%) of product, M.P. 148–153° C. (dec.).

*Analysis.*—Calcd. for $C_9H_{14}N_4O_6S_2$: N, 16.57; S, 18.93. Found: N, 16.10; S, 18.61.

EXAMPLE 5

*5-nitro-4-sulfamyl-2-(β,β,β-trifluoroethylsulfamyl)-aniline*

To a stirred suspension of 8.5 g. (0.025 mole) of 5-nitroaniline-2,4-disulfonyl chloride in 50 ml. of ethanol at 20° C. was added 10 ml. of 5.07 N ethanolic ammonia diluted with 15 ml. of ethanol over about 1 hour. After stirring at 20° C. for an additional hour, 13.5 g. (0.10 mole) of β,β,β-trifluoroethylamine hydrochloride was added in one portion and stirring was continued another 20 minutes. Triethylamine (10 g., 0.10 mole) was added in one portion with cooling and the mixture was stirred another hour at 20° C. Reduction of the volume by one-half in vacuo and dilution to about 300 ml. with water gave, after standing 2 days at room temperature, a solid. This material was collected, washed with water, dried, triturated with ether, and redried to afford 3.0 g. (32%) of product, M.P. 199–201° C.

*Analysis.*—Calcd. for $C_8H_9N_4O_6F_3$: N, 16.93; S, 14.81. Found: N, 17.10; S, 14.87.

EXAMPLE 6

*5-chloro-2,4-bis(dimethylsulfamyl)-N-(3-hydroxy-2-butenylidene)-aniline*

5 - chloro - 2,4 - bis(dimethylsulfamyl)aniline (2.0 g., 0.00585 mole), 3 ml. of acetylacetaldehyde dimethylacetal, and 3 drops of concentrated HCl were dissolved in 20 ml. of dimethylformamide and the solution was held at 90–100° C. for one hour. The solvent was removed in vacuo and the residue was dissolved in 60 ml. of ethanol. After a charcoal treatment, 1 liter of 3:2 n-hexane-ether was added to the solution followed by cooling. A solid separated which was collected and dried to afford 1.6 g. (89%) of product, M.P. 147–149° C.

*Analysis.*—Calcd. for $C_{14}H_{20}ClN_3O_5S$: Cl, 8.65, S, 15.64. Found: Cl, 8.76; S, 15.65. λmax. 345mμ (ε35,660).

EXAMPLE 7

*2-methylsulfamyl-4-sulfamyl-5-trifluoromethyl-N-(3-hydroxy-2-butenylidene)-aniline*

2 - methylsulfamyl-4-sulfamyl-5-trifluoromethylaniline (4.0 g., 0.012 mole), 8 ml. of acetylacetaldehyde dimethylacetal and 3 drops of 10:1 concentrated HCl-water were mixed with gentle warming to provide a solution. After standing at room temperature for 9 days, the amber solution was diluted with 100 ml. of dry ether. A gum separated from which was decanted the solvent. The gum was dissolved in 50 ml. of ethanol, the resultant solution was filtered and 10 ml. of 10% aqueous NaOH was added. After a few minutes, the solution was diluted to 500 ml. with water, adjusted to pH 6 with acetic acid and cooled. A solid separated which was collected, washed with water and dried to afford 1.2 g. (25%) of product, M.P. 199–200° C.

*Analysis.*—Calcd. for $C_{12}H_{14}F_3N_3O_5S_2$: C, 35.90; H, 3.52; N, 10.47. Found: C, 36.45; H, 3.89; N, 10.33. λ max. 350 mμ (ε 30,600).

EXAMPLE 8

*2-allylsulfamyl-5-chloro-4-sulfamyl-N-(3-hydroxy-3-phenyl-2-propenylidene)-aniline*

2 - allylsulfamyl-5-chloro-4-sulfamylaniline monohydrate (3.4 g., 0.01 mole) and 3.4 g. (0.02 mole) of the sodium salt of 3-phenyl-3-oxopropanal were slurried together in 50 ml. of ethanol and 5 ml. of concentrated HCl was added with stirring. After 3 minutes at room temperature, about 20 ml. of water was added. A yellow solid separated which was collected, washed with 2:1 ethanol-water, then ether and dried to provide 2.1 g. (46%) of product, M.P. 232–233° C.

*Analysis.*—Calcd. for $C_{18}H_{18}ClN_3O_5S_2$: C, 47.50; H, 3.98; Cl, 7.78; S, 14.07. Found: C, 47.45; H, 3.78; Cl, 7.83; S, 14.08. λ max. 372 mμ (ε 36,200).

EXAMPLE 9

*5-chloro-2,4-bis(methylsulfamyl)-N-(3-hydroxy-2-butenylidene)-aniline*

5-chloro-2,4-bis(methylsulfamyl)-aniline (4.0 g., 0.013 mole) and 2 drops of concentrated HCl were dissolved in 25 ml. of acetylacetaldehyde dimethylacetal with 25 ml. of ethanol. After 3 hours at room temperature, the solution was diluted with 200 ml. of water and 10 ml. of 10% NaOH. The yellow solution was filtered and excess acetic acid was added. The mother liquor was decanted from the separated gum after cooling and the residue was triturated with ethanol. A solid formed which was collected, ethanol washed and dried to provide 0.8 g. (13%) of product, M.P. 187–189° C.

Analysis.—Calcd. for $C_{12}H_{16}ClN_3O_5S$: C, 37.75; H, 4.22; N, 11.01. Found: C, 37.95; H, 4.12; N, 11.06. λ max. 344 mμ (ε 31,900).

EXAMPLE 10

*2-methyl-sulfamyl-4-sulfamyl-5-trifluoromethyl-N- (2-hydroxycyclohexen-1-yl methylidene)-aniline*

2 - methylsulfamyl-4-sulfamyl-5-trifluoromethylaniline (3.3 g., 0.010 mole) and 2.6 g. (0.020 mole) of freshly distilled 2-formylcyclohexanone were dissolved in 15 ml. of ethanol and 3 drops of concentrated HCl was added. A solid formed after standing overnight. The mixture was diluted with ethanol and the solid was collected, washed with ethanol and dried to provide 2.5 g. (56%) of product, M.P. 214–216° C.

Analysis.—Calcd. for $C_{15}H_{18}F_3N_3O_5S_2$: N, 9.52; S, 14.52. Found: N, 9.42; S, 14.40. λ max. 368 mμ (ε 31,000).

EXAMPLE 11

*2-ethylsulfamyl-4-sulfamyl-5-chloro-N-(3-hydroxy- 2-butenylidene)-aniline*

5 - chloro-2-ethylsulfamyl-4-sulfamylaniline (1.0 g., 0.0032 mole) and 2 drops of 10:1 water/concentrated HCl were dissolved in 5 ml. of acetylacetaldehyde dimethylacetal. After standing overnight at room temperature, the resultant slurry was diluted with 10 ml. of ethanol. The solid was collected, washed with ethanol and dried to provide 1.0 g. (81%) of product, M.P. 235–236° C.

Analysis.—Calcd. for $C_{12}H_{16}ClN_3O_5S_2$: C, 37.73; H, 4.23. Found: C, 37.98; H, 4.17. λ max. 343 mμ (ε 35,750).

EXAMPLE 12

*5-nitro-4-sulfamyl-2-(β,β,β-trifluoroethyl)-sulfamyl- N-(3-hydroxy-2-butenylidene)-aniline*

A solution of 7 drops 10:1 water/concentrated HCl and 1.0 g. (0.0026 mole) of 5-nitro-4-sulfamyl-2-(β,β,β-trifluoroethyl)-sulfamylaniline in 5 ml. of acetylacetaldehyde dimethylacetal was allowed to stand 20 hours at room temperature. The solution was diluted with ethanol and the solid which formed was collected, washed with ethanol and dried to provide 0.8 g. (66%) of product, M.P. 213–215° C. λ max. 334 mμ (ε 25,800).

EXAMPLE 13

*5-nitro-2-propylsulfamyl-4-sulfamyl-N-(3-hydroxy- 2-butenylidene)-aniline*

A solution of 7 drops 10:1 water/concentrated HCl and 1.0 g. (0.003 mole) of 2-propylsulfamyl-5-nitro-4-sulfamyl-aniline in 5 ml. of acetylacetaldehyde dimethylacetal was allowed to stand at room temperature for 20 hours. Dilution with 10 ml. of ethanol, then 100 ml. of water and cooling gave a solid which was collected, washed with water and dried to afford 0.8 g. (64%) of product, M.P. 188–190° C. λ max. 334 mμ (ε 26,200).

EXAMPLE 14

*2-methylsulfamyl-5-nitro-4-sulfamylaniline*

To a stirred slurry of 6.7 g. (0.020 mole) of 4-amino-6-nitro-1,3-benzenedisulfonyl chloride in 50 ml. of absolute ethanol was added 15.0 ml. of a 2.81 N solution of ammonia (0.040 mole) in absolute ethanol over one hour at about 20° C. After stirring for an additional hour at 20° C., 20 ml. of 3.7 N methylamine in absolute ethanol was added in one portion and after stirring for one more hour the mixture was reduced under vaccum to about 40 ml., diluted with 300 ml. of water, treated with activated charcoal, filtered and the filtrate stripped to a gum. This residue was crystallized twice from dilute ethanol to afford 2.0 g. (32%) of products, M.P. 205–206° C.

Analysis.—Calcd. for $C_7H_{10}N_4O_6S_2$: S, 20.72. Found: S, 20.72.

EXAMPLE 15

*2-ethylsulfamyl-5-nitro-4-sulfamylaniline*

This product is produced by a procedure identical to that given in Example 14 except that ethylamine is used in place of methylamine; M.P. 168°–171° C.

EXAMPLE 16

*2-benzylsulfamyl-4-sulfamyl-5-trifluoromethyl-aniline*

To a solution of 20.7 g. (0.060 mole) of 3,4-dihydro-3 - keto - 7-sulfamyl-6-trifluoromethyl-1,2,4-benzothiadiazine-1,1-dioxide in 40 ml. of dimethylformamide was added 2.6 g. of 53% sodium hydride-oil (0.060 mole). An exothermic reaction ensued. After stirring at room temperature for one hour, 10.4 g. (0.061 mole) of benzyl bromide was added dropwise. After stirring at room temperature for an additional hour, the reaction mixture was held at 60° C. for one hour. Cooling and dilution with 1.2 liters of water induced an oil to separate which crystallized on standing. This solid was collected, washed with heptane, and dried to afford 10 g. of crude product, M.P. 210–213° C. The crude product was triturated with chloroform and further purified by dissolution in dilute sodium hydroxide and reprecipitated with dilute acetic acid to afford 7.8 g. (30%) of pure 2-benzyl-3, 4 - dihydro - 3-keto-7-sulfamyl-6-trifluoromethyl-1,2,4-benzothiadiazine-1,1-dioxide, M.P. 229°–231° C.

Analysis.—Calcd. for $C_{15}H_{12}N_3O_5S_2F_3$: N, 9.65; S, 14.73. Found: N, 9.68; S, 14.49.

A solution of 7.8 g. (0.018 mole) of 2-benzyl-3,4-dihydro - 3 - keto-7-sulfamyl-6-trifluoromethyl-1,2,4-benzothiadiazine-1,1-dioxide in 70 ml. of 10% sodium hydroxide was refluxed and stirred for 6 hours. Cooling, adjustment of the pH to 2–3 with concentrated hydrochloric acid and further cooling afforded a solid which was collected, washed with water and dried. Recrystallization of this crude product from ethanol (charcoal) gave 4.6 g. (63.1%) of pure product, M.P. 190–194° C.

Analysis.—Calcd. for $C_{14}H_{14}N_3O_4S_2F_3$: N, 10.26; S, 15.66. Found: N, 10.19; S, 15.46.

Various changes and modifications of the invention can be made and, to the extent that such variations incorporate the spirit of this invention, they are intended to be included within the scope of the appended claims.

What is claimed is:

1. Compound of the formula

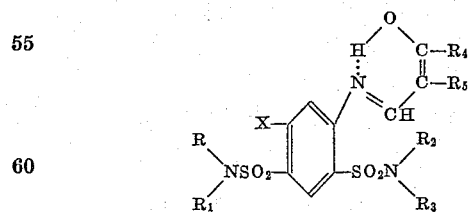

wherein X is a member of the group consisting of halogen, nitro and halo-lower alkyl, R, $R_1$, and $R_2$ are members of the group consisting of hydrogen, lower alkyl, lower alkenyl, lower alkynyl, phenyl-lower alkyl and halo-lower alkyl $R_3$ is a member of the group consisting of lower alkyl, lower alkenyl, lower alkynyl, phenyl-lower alkyl and halo-lower alkyl, and $R_4$ and $R_5$ represent members of the group consisting of hydrogen, lower alkyl, phenyl, phenyl-lower alkyl and groups in which $R_4$ and $R_5$ are joined to each other and together constitute a lower alkylene having 3 to 5 carbons.

2. 2-lower alkyl sulfamyl-4-sulfamyl-5-halo-N-(3-hydroxy-2-butenylidene)-aniline.

3. 2-lower alkyl sulfamyl-4-sulfamyl-5-trifluoromethyl-N-(3-hydroxy-2-butenylidene)-aniline.

4. 2 - allylsulfamyl-4-sulfamyl-5-chloro-N-(3-hydroxy-2-butenylidene)-aniline.

5. 5 - chloro-2,4-bis-(dimethylsulfamyl)-N-(3-hydroxy-2-butenylidene)-aniline.

6. 2 - methylsulfamyl-4-sulfamyl-5-trifluoromethyl-N-(3-hydroxy-2-butenylidene)-aniline.

7. 2 - allylsulfamyl-5-chloro-4-sulfamyl-N-(3-hydroxy-3-phenyl-2-propenylidene)-aniline.

8. 5 - chloro-2,4-bis-(methylsulfamyl)-N-(3-hydroxy-2-butenylidene)-aniline.

9. 2 - methylsulfamyl-4-sulfamyl-5-trifluoromethyl-N-(2-hydroxycyclohexen-1-yl methylidene)-aniline.

10. 2 - ethylsulfamyl - 4-sulfamyl-5-chloro-N-(3-hydroxy-2-butenylidene)-aniline.

11. 5 - nitro-4-sulfamyl-2-($\beta,\beta,\beta$-trifluoroethyl)-sulfamyl-N-(3-hydroxy-2-butenylidene)-aniline.

12. 5 - nitro - 2-propylsulfamyl-4-sulfamyl-N-(3-hydroxy-2-butenylidene)-aniline.

References Cited by the Examiner

UNITED STATES PATENTS

| 2,804,422 | 8/57 | Schumann et al. | 167—65 |
| 2,902,404 | 9/59 | Spencer | 167—65 |
| 2,965,656 | 12/60 | Novello | 260—397.7 |
| 2,970,154 | 1/61 | Werner et al. | 260—397.7 |
| 3,004,024 | 10/61 | Yale et al. | 260—556 |

FOREIGN PATENTS

| 219,585 | 2/62 | Austria. |
| 596,826 | 5/61 | Belgium. |
| 618,769 | 4/61 | Canada. |

OTHER REFERENCES

Topliss et al.: J. Org. Chem., vol. 26, pages 3842–3850 (1961).

IRVING MARCUS, *Primary Examiner.*

NICHOLAS S. RIZZO, *Examiner.*

UNITED STATES PATENT OFFICE
CERTIFICATE OF CORRECTION

Patent No. 3,188,329            June 8, 1965

Jerry E. Robertson

It is hereby certified that error appears in the above numbered patent requiring correction and that the said Letters Patent should read as corrected below.

Column 4, line 39, for "970/981" read -- 970-981 --; same column 4, lines 71 to 75, for the right-hand portion of the formula reading

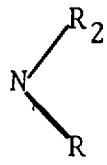        read        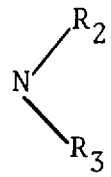

column 5, lines 3 to 6, for the lower left-hand portion of the formula reading

        read        

column 6, line 67, for "$NO_3$" read -- $N_3$ --; same line 67, for "1972" read -- 19.72 --; column 9, line 75, for "vaccum" read -- vacuum --; column 10, line 4, for "products" read -- product --.

Signed and sealed this 23rd day of November 1965.

(SEAL)
Attest:

ERNEST W. SWIDER
Attesting Officer

EDWARD J. BRENNER
Commissioner of Patents